Figure 1:
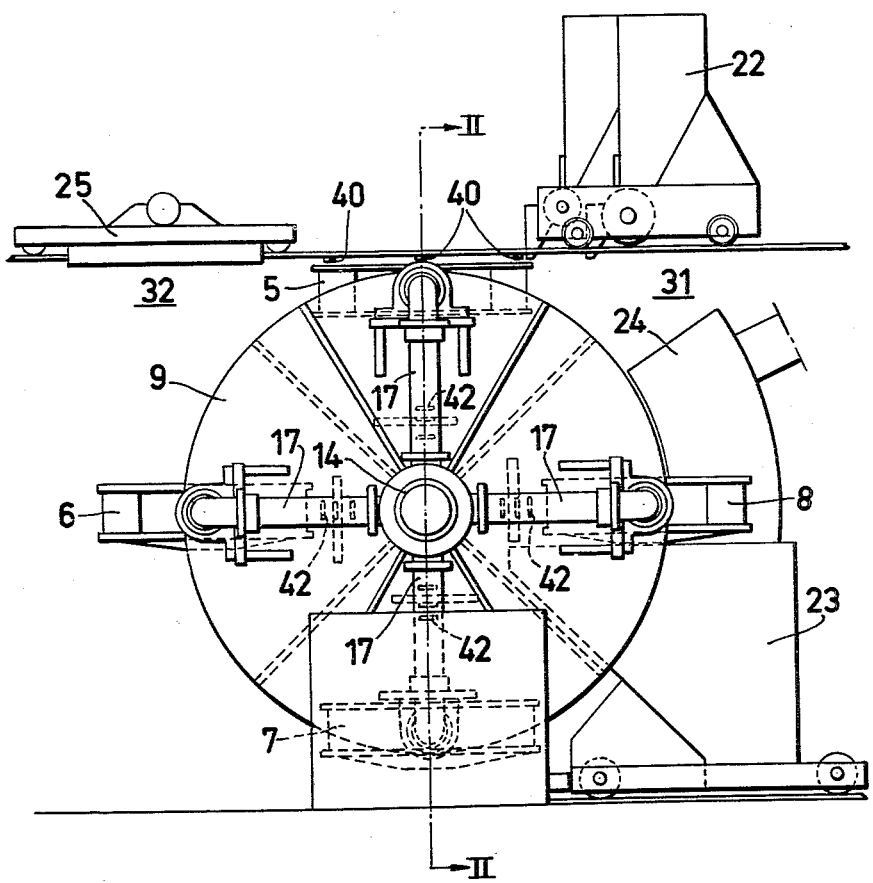

Nov. 22, 1960 A. HOLMBERG ET AL 2,961,232
SINTERING APPARATUS
Filed May 27, 1957 5 Sheets-Sheet 1

INVENTORS:
ANDERS HOLMBERG
NILS JOHAN DAVY NILSSON
By
Richardson, David and Nordon
ATTY'S Nov. 22, 1960 A. HOLMBERG ET AL 2,961,232
SINTERING APPARATUS
Filed May 27, 1957 5 Sheets—Sheet 5

INVENTORS:
ANDERS HOLMBERG
NILS JOHAN DAVY NILSSON
By
Richardson, David and Nordon
ATTYS

United States Patent Office 2,961,232
Patented Nov. 22, 1960

2,961,232
SINTERING APPARATUS

Anders Holmberg, 68 Grevgatan, Stockholm, Sweden, and Nils Johan Davy Nilson, 7 Skepparstigen, Saltsjobaden, Sweden Filed May 27, 1957, Ser. No. 661,688

Claims priority, application Sweden July 30, 1956

1 Claim. (Cl. 266—21)

The present invention relates to a process and an apparatus for sintering ores, slicks, roasted pyrites, blast furnace dust and the like, and the object of the invention is to provide a plant that is simple and inexpensive and reliable in running from a technical point of view with practically a continuous course of operation at the same time as a first-class sinter quality is obtained under hygienic working conditions.

According to the invention the material to be sintered is charged in a sintering pan and ignited, and the pan is then caused to pass in a cycle round a shaft that is at least substantially horizontal, at the same time as air and gases formed during the sintering operation are exhausted from the pan through the shaft which is hollow. The sintering is finished in the pan before the cycle has been closed, whereafter the pan is emptied, is conveyed further for a new charge and is again caused to circulate in the same way. Preferably a plurality of pans are caused to pass round the shaft simultaneously and are charged consecutively with material which thereupon is ignited, sintered and removed.

A suitable device for carrying out the process according to the invention consists of a plurality of tiltable sinter pans rotatably mounted round a substantially horizontal shaft, the bottoms of the said pans communicating with suction pipes, connected to the hollow shaft, a charging device for supplying the material to be sintered, when the pan is in a certain position, an ignition device for igniting the charge in the position, and a container for receiving the sintered material, when tilting the pan in a subsequent position. The sinter pans are preferably mounted on a vertical wheel in such a manner that they do not change position during rotation with the wheel. This is made possible thereby that the pans are so formed that their point of gravity in charged as well as in uncharged condition, is located below the axis round which they are mounted. The suction pipes extending from the pans are preferably rigidly connected with the wheel and provided with valves which are adapted to be actuated by a rail placed round the shaft of the wheel in order to control the flow of gas arriving from the pans. The valves are preferably throttle valves the shafts of which are provided with levers, which engage the rail resiliently.

Figure 2:
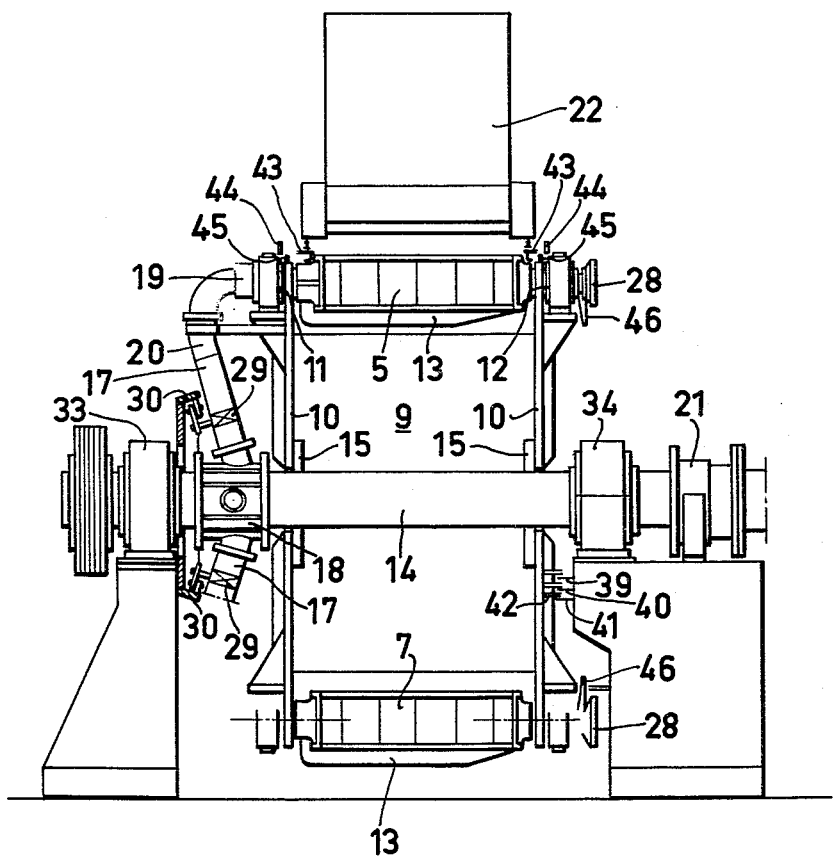
Figure 3:
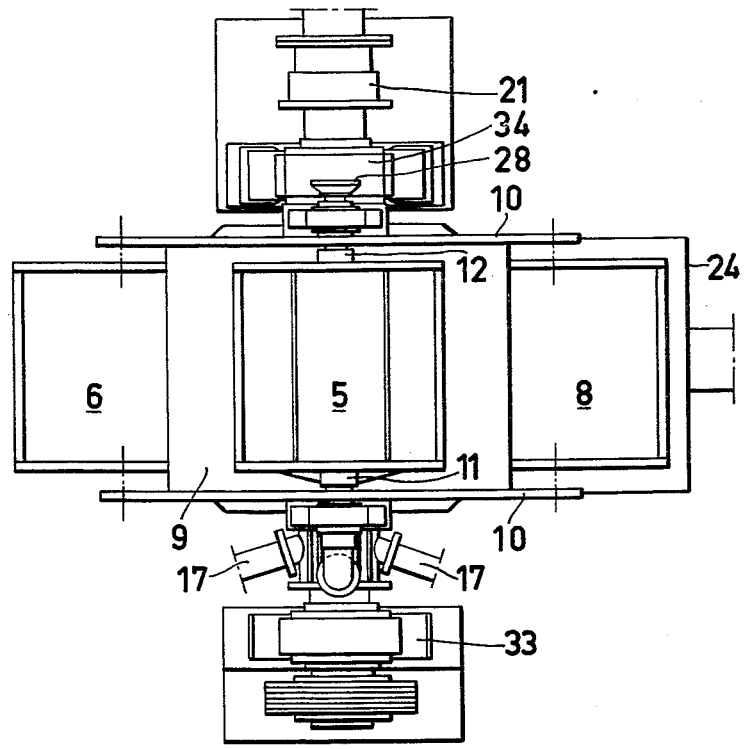
Figure 4:
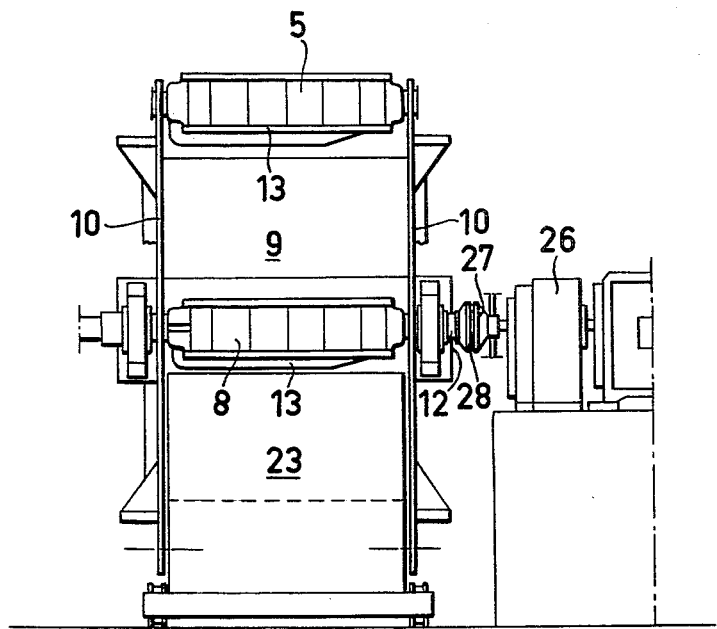
Figure 5:
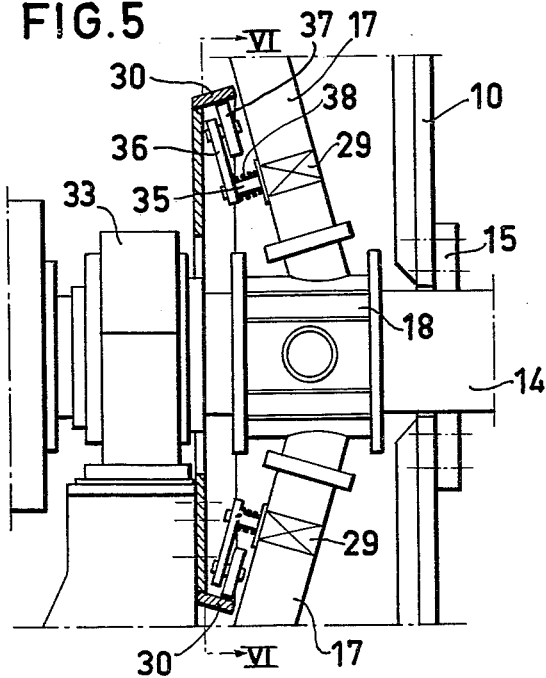
Figure 6:
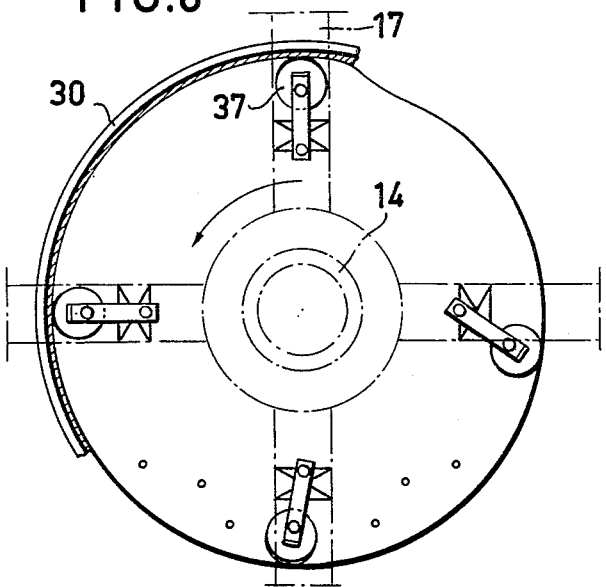

The invention will now be described with reference to the accompanying drawing in which an embodiment of a device for sintering ores is illustrated. Fig. 1 shows a lateral view of the device, Fig. 2 is a section along the line II—II in Fig. 1, and Fig. 3 is a plan view of the device. Fig. 4 is a side view, seen towards that side of the device where the pans are tilted. Fig. 5 shows on a larger scale a detail for controlling the flow of gas from the pans, and Fig. 6 is a section along the line VI—VI in Fig. 5.

In the drawings reference numerals 5, 6, 7, and 8 designate sinter pans which are mounted round pivots 11 and 12 in the circular walls 10 of a wheel 9, which is applied on a central hollow shaft 14 by means of flanges 15. The walls 10 are attached to the flanges 15 by means of bolts, and oblong holes have been made in the flanges, so that the expansion caused by the heat from the shaft 14 can be taken up. The bottoms 13 of the pans communicate with suction pipes 17 through the pivots 11 which are hollow, the said suction pipes being connected to the shaft 14 over a pipe socket 18. In order to provide the vacuum necessary for the sintering a suction fan of a well known kind is used, which is connected to the hollow shaft 14. The hollow pivots 11 are connected to the suction pipes 17 over tight expansion boxes 19. The suction pipes 17 and the shaft 14 are provided with expansion boxes 20 and 21 respectively for taking up the expansion caused by the heat. The pipe socket 18 is provided with flanges for the removal of heat. Reference numeral 22 designates a charging device by means of which the material to be sintered is supplied to the pans. The said charging device can be moved to and fro over the sintering pan located highest in the wheel 9. Reference numeral 23 designates a container adapted to receive the sintered material when tipping the pans. In order to catch the dust occurring at the tipping a dust hood 24 is placed over the container 23. From this hood the dust can be removed by means of a dust sucking fan. For the ignition of the pans an ignition apparatus 25 is provided, which can be moved to and fro over the sintering pan located highest in the wheel 9. The ignition apparatus may be fired with oil or gas. For tipping the pans (see Fig. 4) a driving machinery 26 is provided having a coupling consisting of two coupling parts 27 and 28, the latter 28 being connected to the pivot 12 of the pan. For the control of the sintering operation in the pans throttle valves 29 are provided in the suction pipes 17. The valves are actuated during the operation with the aid of a rail 30 (see Figs. 5 and 6) which forms an orbital curve. The shafts 35 of the valves 29 are provided with levers 36 which in their free ends carry a roll 37, which rests resiliently against the rail 30 with the aid of a screw spring 38 applied round the shafts 35. The rail 30 is so formed that the distance therefrom to the shaft 14 is greatest, when the valves 29 are in open position, and smaller according as the valves are to be choked. The wheel 9 is mounted in two bearings 33 and 34.

The sintering pan 5 is charged with the aid of the charging device 22 with bed material and ready-mixed charge from a raw material section. Thereafter the charging device 22 is restored to its place 31 in order to receive further charge material. In the meantime the ignition apparatus 25 is brought forward and the pan which is subjected to suction action is ignited. When the pan has been ignited, the ignition apparatus is returned to its place 32. Thereafter the wheel 9 is started, whereby the sintering pan 8, which recently has been tipped, is set in motion towards the place of charge. When the pan 8 has reached the place of charge, the wheel is stopped and charging and ignition take place. The same operation is repeated with the pans 7 and 6 and so on. By means of the rail 30 and the valves 29 in the suction pipes 17 the exhaust of gases from the sintering pans and the vacuum at the sintering are controlled, so that a greater amount of gas is exhausted, when necessary, while the exhaustion of gas is almost entirely choked when the pans are tipped.

During the rotation of the wheel 9 time relays 39, 40 and 41 actuate the reciprocating motion of the container 23 for sintered material, the charge container 22 and the ignition apparatus 25 through stops 42, which are provided on the wall 10 of the wheel 9. During the charging the pan is locked by means of pistons 43 which are pulled to and fro by means of relays 44 which are actuated by stops 45 on the wheel 9. On the pivot 12 of the pans a stop 46 is provided which acts upon a time relay so that the coupling part 26 is automatically connected, when the pan has reached the position of tipping, and when the tipping operation has been finished, the coupling part 27 is released, when the wheel 9 is set in motion.

The sintered material tipped from the pans to the container 23 is carried to a crushing and screening plant for classification and separation of sinter respectively bed and return material, the latter being restored to the raw material section of the sintering plant, whereas the finally sintered, classified sinter is conveyed to the foundry or to be stored.

What we claim is:

A sintering apparatus comprising a centrally positioned horizontally extending rotatable suction duct, a pair of vertically extending wheels affixed in spaced relation upon said duct, a plurality of circumferentially spaced pivotable sintering pans extending horizontally between peripheral portions of said wheels, each pin being mounted to remain upright as it is rotated by said wheels, a hollow pivot member for each pan affixed to one of said wheels, a conduit interconnecting each hollow pivot member with said duct, valve means in each conduit for regulating the flow of gases from its respective pan to said duct, a stationary cam ring mounted adjacent the wheel carrying said hollow pivot members and having means for regulating the operation of said valves, means for successively charging each pan with ore to be sintered, means for successively igniting each charged pan, and means for successively tilting each pan after the contents thereof have been sintered, said tilting means including a coupling part carried by each pan, a motor adjacent one of said wheels, and a further coupling part carried by said motor and engageable with said first-mentioned coupling part whereby said motor may be utilized to tilt said pan about its horizontal axis to discharge the contents thereof.

References Cited in the file of this patent

UNITED STATES PATENTS

| | | |
|---|---|---|
| 1,020,345 | Dwight et al. | Mar. 12, 1912 |
| 1,166,142 | Meyer | Dec. 28, 1915 |
| 1,245,183 | Boynton et al. | Nov. 6, 1917 |
| 1,358,293 | Corbould | Nov. 9, 1920 |
| 1,433,354 | Dwight | Oct. 24, 1922 |
| 2,041,472 | Holmberg | May 19, 1936 |
| 2,230,234 | Davison et al. | Feb. 4, 1941 |
| 2,386,393 | Gelbman | Oct. 9, 1945 |
| 2,543,150 | Burgess | Feb. 27, 1951 |
| 2,725,020 | Mahoney | Nov. 29, 1955 |